UNITED STATES PATENT OFFICE.

ALFRED MILLS, OF SUPERIOR, WISCONSIN.

COMPOSITION OF MATTER.

979,021. Specification of Letters Patent. Patented Dec. 20, 1910.

No Drawing. Application filed June 13, 1910. Serial No. 566,500.

*To all whom it may concern:*

Be it known that I, ALFRED MILLS, a citizen of the United States of America, residing at Superior, in the county of Douglas and State of Wisconsin, have invented certain new and useful Improvements in Composition of Matter, of which the following is a specification.

This invention relates to composition for the scaling of boilers, said invention being classified as inventions relating to incrustation.

An object of this invention is to provide an inexpensive composition designed to prevent sediment from adhering to the surfaces of boilers and for preventing the accumulation of scales or other foreign substances which may have a tendency to cause deterioration of the metal or impairing the utility of the boiler, and as a water softener for alkali and other hard water.

A still further object of this invention is to produce a composition which may be employed while the boiler is being used, the same consisting of comparatively inexpensive ingredients which will be found to prove efficient and satisfactory in use.

With the foregoing and other objects in view, the invention consists in the composition of matter comprising the ingredients and substantially the proportions to be hereinafter more fully set forth and specifically claimed.

In the production of the composition, I utilize: water (substantially pure) 25 gallons, molasses, 75 gallons, castor oil, 100 ounces, and creosote, 50 ounces, or wood alcohol, 200 ounces. The ingredients are to be thoroughly mingled by agitation.

I claim:

The herein described composition of matter for removing mud, sediment and scales from iron or steel, and as a water softener for alkali and hard water, consisting of water, molasses, castor oil and creosote.

In testimony whereof, I affix my signature in the presence of two witnesses.

ALFRED MILLS.

Witnesses:
JOSEPH REED,
H. O. BARDIN.